United States Patent
Liou et al.

(10) Patent No.: US 7,477,333 B2
(45) Date of Patent: Jan. 13, 2009

(54) LIQUID CRYSTAL DISPLAY PANEL WITH ELECTROSTATIC DISCHARGE PROTECTION

(75) Inventors: Meng-Chi Liou, Taoyuan (TW);
Fu-Yuan Shiau, Chiayi (TW);
Kuang-Hsiang Lin, Taoyuan Hsien (TW); Yung-Hui Chang, Chu Pei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 456 days.

(21) Appl. No.: 11/213,820

(22) Filed: Aug. 30, 2005

(65) Prior Publication Data

US 2007/0046845 A1    Mar. 1, 2007

(51) Int. Cl.
G02F 1/1343    (2006.01)
G02F 1/1333    (2006.01)
(52) U.S. Cl. .............................. 349/40; 349/54; 349/55
(58) Field of Classification Search ................... 349/40, 349/54, 55, 192
See application file for complete search history.

(56) References Cited

U.S. PATENT DOCUMENTS

| | | | |
|---|---|---|---|
| 5,068,748 A * | 11/1991 | Ukai et al. | 349/40 |
| 5,073,754 A | 12/1991 | Henley | |
| 5,233,448 A * | 8/1993 | Wu | 349/40 |
| 5,235,272 A | 8/1993 | Henley | |
| 5,459,410 A | 10/1995 | Henley | |
| 5,491,347 A | 2/1996 | Allen et al. | |
| 5,497,146 A * | 3/1996 | Hebiguchi | 340/14.63 |
| 5,668,032 A * | 9/1997 | Holmberg et al. | 438/149 |
| 5,969,779 A * | 10/1999 | Kim et al. | 349/54 |
| 2003/0030054 A1* | 2/2003 | Hector et al. | 257/72 |
| 2003/0112402 A1* | 6/2003 | Nakajima et al. | 349/149 |
| 2005/0195338 A1* | 9/2005 | Matsumoto et al. | 349/40 |

FOREIGN PATENT DOCUMENTS

WO    WO-98/31050 A1    7/1998

* cited by examiner

*Primary Examiner*—Andrew Schechter
(74) *Attorney, Agent, or Firm*—Muncy, Geissler, Olds & Lowe, PLLC

(57) ABSTRACT

A liquid crystal display with electrostatic discharge protection includes an inner short-ring which surrounds the display region and an outer short-ring which surrounds the inner short-ring, wherein the inner short-ring and the outer short-ring are both located near the panel edge. The inner short-ring is connected with the display region indirectly, and the outer short-ring is electrically connected with the display region and the inner short-ring at the same time. The inner short-ring is electrically connected with the display region through the outer short-ring, and the inner short-ring can serve as a repair line after edge grinding the panel.

18 Claims, 3 Drawing Sheets

LIQUID CRYSTAL DISPLAY PANEL WITH ELECTROSTATIC DISCHARGE PROTECTION

FIELD OF THE INVENTION

The present invention relates to a liquid crystal display (LCD), and more particularly, relates to an LCD panel with electrostatic discharge protection.

BACKGROUND OF THE INVENTION

Typically, static electricity may be generated during the process of manufacturing an LCD panel driven by a thin-film transistor (TFT), such as during chemical vapor deposition (CVD), sputtering, dry etching, or the steps that utilize electronic plasma. In addition, static electricity may be introduced from the external environment during packaging or delivery.

Since the use of insulation glass as the substrate of an LCD panel restricts the removal of static electricity, the static electricity generated by the manufacturing process accumulates in the LCD panel to cause high potential difference between the LCD panel and the TFT. When the accumulated static electricity is discharged, an instantaneous current with high voltage can affect the function of the TFT and can even cause permanent damage. Therefore, eliminating electrostatic discharge form the LCD panel is an important aspect for increasing the manufacturing yield during the manufacturing process.

In the past, applying a static eliminator and developing the process steps have been applied to eliminate static electricity. However, these methods cannot eliminate static electricity completely to resolve the problems aforementioned.

Currently, an electrostatic discharge protection device is provided which serves as a short-ring circuit set around the active displaying area of a LCD panel. The short-ring circuit can direct the static electricity accumulated in the LCD panel out to protect the electrical devices from being damaged.

However, electromagnetic interference (EMI) generated by the short-ring circuit can interfere with the signals of the LCD panel. It has been found that the lower the resistance of the short-ring circuit, the more effectively the short-ring circuit can disperse static electricity. However, in this condition, the short-ring circuit generates EMI more easily. So, the use of such a short-ring circuit is rather limited.

SUMMARY OF THE INVENTION

Therefore, it is desirable to provide an electrostatic discharge protection device that can protect the LCD panel from electrostatic discharge more effectively.

One aspect of the present invention is to provide an LCD panel with electrostatic discharge protection and having repairing lines for a laser repairing process, wherein the repairing lines are integrated with electrostatic discharge protection circuits to reduce the routing layout routed thereon. The electrostatic discharge protection circuits can be removed after the main frame of the LCD panel is obtained. Thus, the static electricity accumulated on the LCD panel can be dispersed out by the electrostatic discharge protection circuits; at the same time, the impact from the EMI generated by the electrostatic discharge protection circuits can be minimized.

In accordance with the aspect of the present invention, an LCD panel with electrostatic discharge protection is provided. At least two short-ring circuits are used to protect the electrical devices within the display area of the LED panel from electrostatic discharge. The short-ring circuits adjacent to the display area, named inner short-rings, are designed to not electrically connect to the display area directly. The short-ring circuits adjacent to the edge of the LCD panel, named outer short-rings, are used to electrically connect the inner protection circuits with the display area. After an edge grinding process is conducted on the LCD panel, the outer short-rings are removed to disconnect the inner short-rings from the display area. And then the remaining inner short-rings can be used as repairing lines for repairing the defects occurring on the display area.

In a present embodiment of the present invention, the electrostatic discharge protection device having at least two short-ring panels surrounding the display area is settled adjacent to the edge of an LCD panel, wherein the short-rings comprise an inner short-ring and an outer short-ring. The inner short-ring adjacent to and surrounding the edge of the display area intersects with the scan lines and data lines crisscrossing in the display area, wherein the inner short-ring circuit, the scan lines and the data lines are not coplanar with each other, and are apart from one another, so each of the same is not electrically connected to each other.

The outer short-ring adjacent to the edge of the LCD panel and surrounding the inner short-ring electrically connects the inner short-ring with the data lines and the scan lines to form a short circuit. Static electricity accumulated in the LCD panel during the manufacturing process thereof can be led to and dispersed on the inner short-ring and the outer short-ring via the short circuit.

After the main frame of the LCD panel is obtained, the outer short-ring is then removed by an edge grinding process conducted thereon to disconnect the inner short-ring from the data lines and the scan lines. Then, the remaining inner short-ring can serve as a repairing line for repairing the defects occurring on the data lines and the scan lines via a laser repairing process.

In the present embodiment, the outer short-ring electrically connects to the data lines and the scan lines via contacts formed through thereof. And the LCD panel further comprises a plurality of guards used to protect the LCD panel from EMI generated by these short-rings. The guards settled on the routes electrically connect the outer short-ring with the display area. The guards can be removed by the edge grinding process used to remove the outer short-ring.

Accordingly, the short-rings not only provide additional routes for dispersing static electricity, but also serve as repairing lines for repairing the defects that occur on the data lines and the scan lines after the edge grinding process for removing the outer short-rings. In other words, the present LCD panel integrates additional static electricity-dispersing lines with repairing lines on an LCD panel to enhance the dispersion of static electricity without occupying any routing space.

Therefore, the present LCD panel not only provides electrostatic discharge protection more effectively, but also provides laser-repairing functionality without utilizing any additional routing to affect the display quality of the same.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing, wherein.

DETAILED DESCRIPTION OF THE PREFERRED EMBODIMENT

One aspect of the present invention is to provide an LCD panel having the function of electrostatic discharge protection, wherein a plurality of short-rings are settled adjacent to the edge thereof for enhancing the dispersion of static electricity from the same more effectively. Parts of the short-rings are designed to electrically connect to the display area of the LCD panel directly, and the others are not. In addition, guards are set on the short-rings for protecting the LCD panel from the EMI generated by the short-rings. Then, the short-rings connected to the display area directly and the guards can be removed by an edge grinding process.

The foregoing aspects and many of the attendant advantages of this invention will be described in detail by reference to the following embodiments.

Embodiment 1

In the first preferred embodiment, an LCD panel with electrostatic discharge protection is provided.

Figure 1:
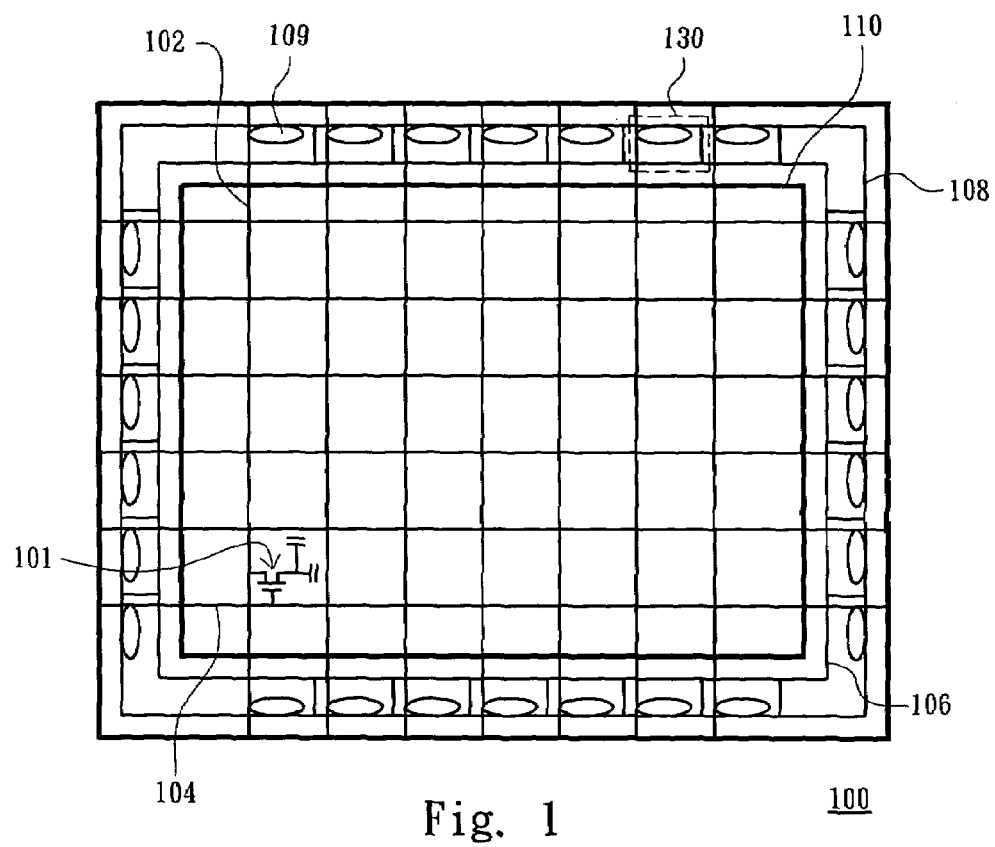
FIG. 1 is a vertical view illustrating the pixel array of an LCD panel, in accordance with the first preferred embodiment of the present invention.

FIG. 1 is a vertical view illustrating the pixel array of an LCD panel, in accordance with the first preferred embodiment of the present invention.

The display area 110 located in the LCD panel 100 has a pixel array, wherein data lines 102 and scan lines 104 intersecting in the display area 110 are used to control the TFT 101 of the LCD panel 100 for turning on or turning off each pixel of the pixel array. Two short circuits used for protecting the display area 110 from electrostatic discharge are formed surrounding thereof. The short circuit adjacent to the edge of the display area 110 is named the inner short-ring 106, and the short circuit adjacent to the edge of the LCD panel 100 is named the outer short-ring 108.

The inner short-ring 106 is designed as a circuit electrically connecting to the outer short-ring 108, but not connecting to the display area 110 directly. The inner short-ring 106 intersects with the scan lines 104 and data lines 102 cross-routed in the display area 110. Since the inner short-ring 106, the scan lines 104 and the data lines 102 are not coplanar with each other; the inner short-ring 106 does not electrically connect to the scan lines 104 and data lines 102 directly. The outer short-ring 108 is designed as a circuit that electrically connects the data lines 102 and the scan lines 104 to form a short circuit that connects the display area 110 with the inner short-ring 106.

In addition, a plurality of guards 109 are installed between the inner short-ring 106 and the outer short-ring 108 used to protect the signals transferring within the routing of the LCD panel 100 from the EMI generated by these short-rings. Each guard 109 electrically connected with the outer short-ring 108 consists of two TFT devices.

Since the outer short-ring 108 connects the inner short-ring 106 with the data lines 102 and the scan line 108, static electricity accumulated in the display area 110 can be dispersed on the outer short-ring 108 and the inner short-ring 106 via the data lines 102 and the scan line 108.

When the main frame of the LCD panel 100 is obtained, the outer short-ring 108 and the guards 109 are then removed by an edge grinding process conducted thereon, wherein the inner short-rings 106 surrounding thereof is left remaining.

Figure 2:
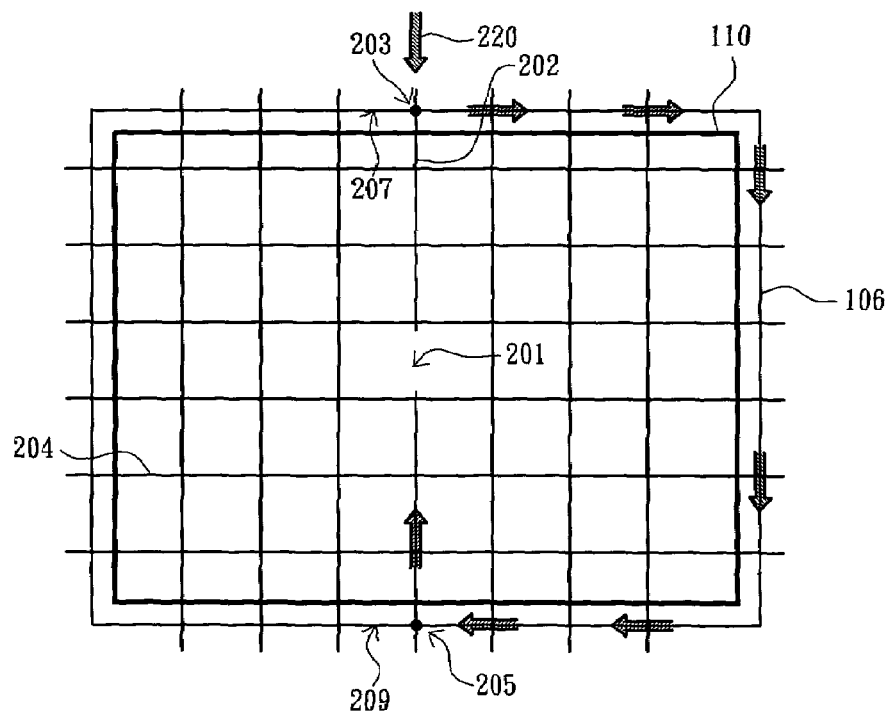
FIG. 2 is the vertical view of the LCD panel after an edge grinding process is conducted thereon, in accordance with FIG. 1.

FIG. 2 is the vertical view of the LCD panel after an edge grinding process is conducted thereon, in accordance with FIG. 1. Since the inner short-rings 106 disconnect with the display area 110 via the outer short-ring 108, after the inner outer short-ring 108 is removed, the inner short-ring 106 is disconnected from the display area 110. Therefore, the inner short-ring 106 cannot disperse static electricity from the display area 110 any more. Alternatively, the inner short-ring 106 serves as a repairing line to repair the defects that occur in the display area 110.

Referring to FIG. 2, when a defect 201, such as an open occurs on the data line 202, a laser repairing process can be conducted on the intersections of the inner short-ring 106 and the data line 202 (such as intersections 203 and 205) to connect the data line 202 with the inner short-ring 106; subsequently, the inner short-ring 106 is burned out on the position 207 and 209 by a laser. Thus, the disconnected data line 202 is reconnected via the inner short-ring 106.

Accordingly, the signals originally transferred by the data line 202 can be transferred via the repaired line in spite of the defect 201 occurring on the data line 202. Similarly, the inner short-ring 106 can be used to repair any defects occurring on the scan line 204 by a laser process.

Figure 3:
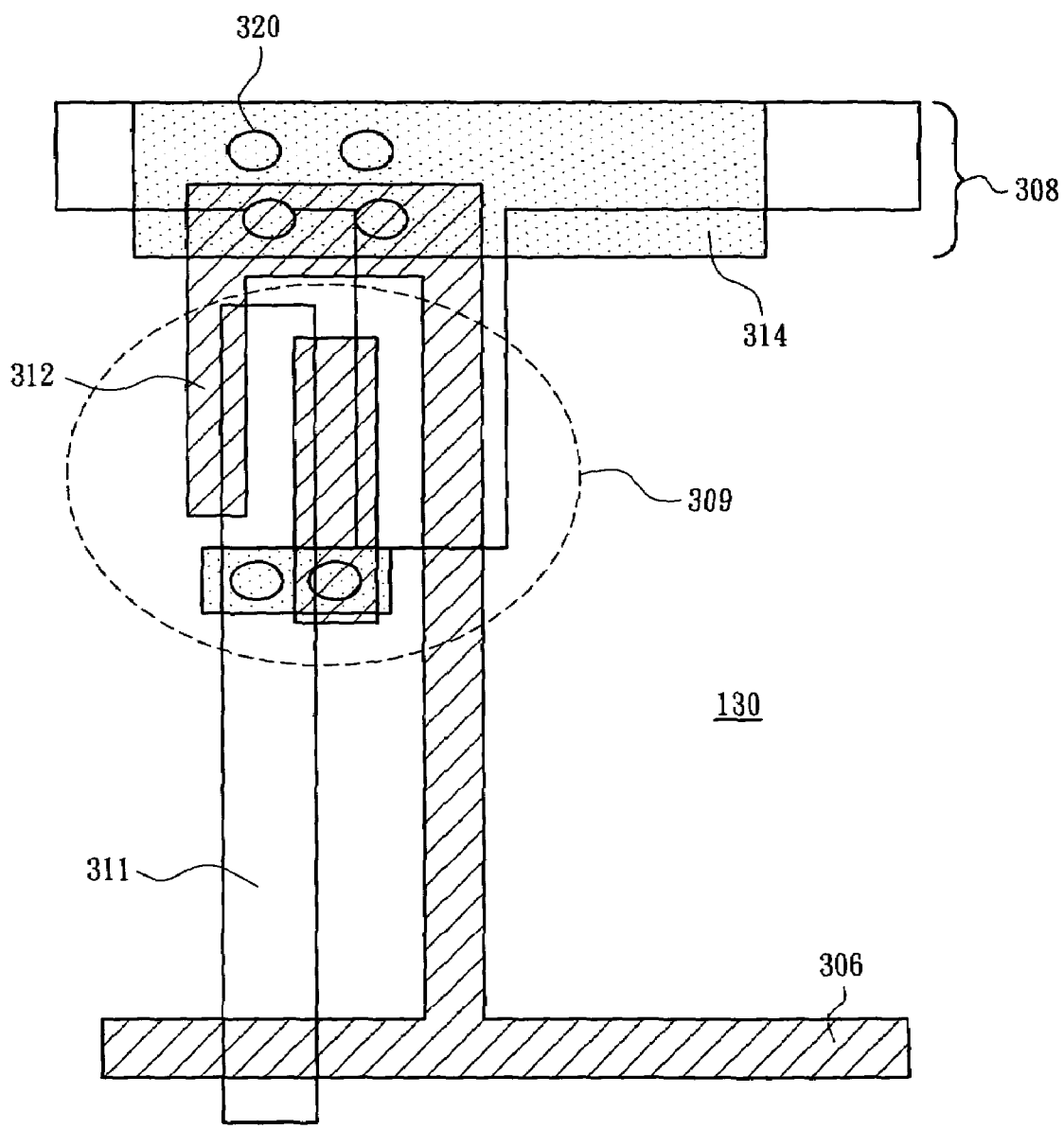
FIG. 3 is a partial perspective view illustrating the structure of the short-rings, in accordance with the first preferred embodiment of the present invention.

FIG. 3 is a partial perspective view illustrating the structure of the short-rings, in accordance with the first preferred embodiment of the present invention. In the present embodiment, the outer short-ring 308 consists of multiple layers of metal. For example, the outer short-ring 308 consists of the gate metal layer 311, the source/drain metal layer 312 and the pixel electrode metal layer 314, wherein the three layers are not coplanar. The source/drain metal layer 312 is formed on the gate metal layer 311, and the pixel electrode metal layer 314 is formed on the source/drain metal layer 312, wherein the gate metal layer 311, the source/drain metal layer 312, and the pixel electrode metal layer 314 are electrically connected with each other via contacts 320 formed through thereof. Thus, the outer short-ring 308 provides additional routes for dispersing the static electricity accumulated in the display area.

The inner short-ring 306 is a circuit formed of a single metal layer. For example, the inner short-ring 306 is formed of the source/drain metal layer 312 identified in a circular shape.

The guard 309, illustrated by the elliptical dotted line, consists of two TFTs. Since the outer short-ring 308 connected with the data lines and the scan lines can generate EMI, the guard 309 is used to protect the LCD panel from EMI that can interfere with the quality control (QC) test signals during the manufacturing process. The gate metal layer 311 connects the guard 309 with the data lines and the scan lines of the display area. The source/drain metal layer 312 that serves as some parts of the inner short-ring 306, the outer short-ring 308, and the guard 309 connects with the display area.

Accordingly, the outer short-ring 308, the inner short-ring 306 and the guard 309 comprises a short circuit. Static electricity accumulated in the display area can be dispersed on the outer short-ring 308 and the inner short-ring 306 to reduce the impact of electrostatic discharge more effectively.

After the main frame of the LCD panel is obtained, the outer short-ring 308 and guard 309 are then removed by an edge grinding process conducted thereon to disconnect the short circuit, leaving the inner short-ring 306 to remain. The remaining inner short-ring 306 can serve as a repairing line for repairing the defects occurring on the display area.

Except for having only one inner short-ring, in some embodiments of the present invention, the LCD panel can further have two or more inner short-rings connected with the outer short-ring to enhance the dispersion of static electricity.

According to the first preferred embodiment, the feature of the present invention is to add additional short-rings for enhancing the effectiveness of static electricity dispersion, reducing the impact of electrostatic discharge more effectively.

Furthermore, the redundant short-rings can be removed by an edge grinding process after the mainframe of the LCD panel is obtained, wherein the remaining short-rings serve as repairing lines to provide a laser repairing function.

Therefore, the LCD panel of the present provides both functions of developed electrostatic discharge protection and laser repairing without occupying any additional space thereof.

Embodiment 2

In the second preferred embodiment, an LCD panel with electrostatic discharge protection is provided, wherein three short-rings are applied for enhancing the dispersion of static electricity and providing repairing lines for laser repair.

Figure 4:
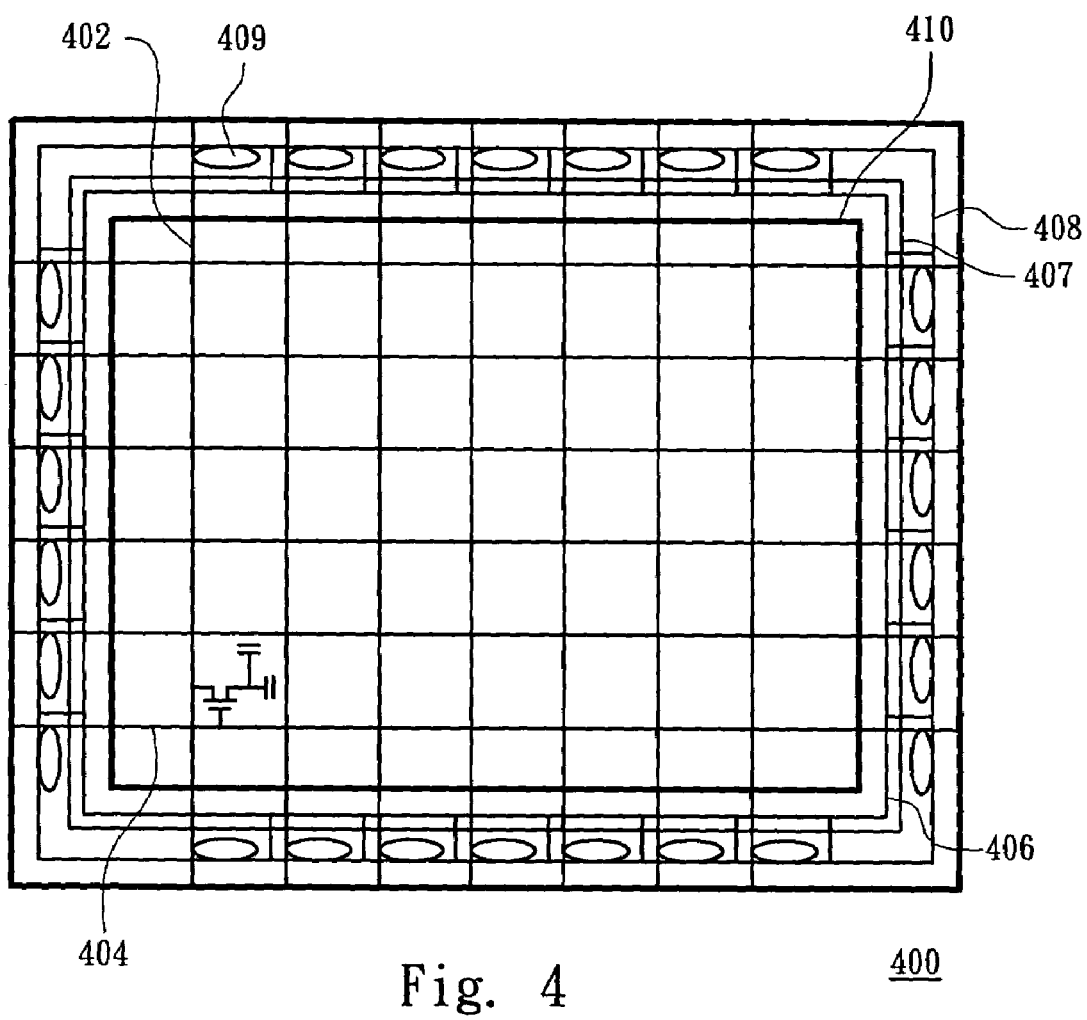
FIG. 4 is a vertical view illustrating the pixel array of an LCD panel, in accordance with the second preferred embodiment of the present invention.

FIG. 4 is a vertical view illustrating the pixel array of an LCD panel, in accordance with the second preferred embodiment of the present invention.

Similar to the structure shown in FIG. 1, the display area 410 located in the LCD panel 400 has a pixel array, wherein data lines 402 and scan lines 404 intersecting in the display area 410 are used to control the pixel array. Three short circuits used for protecting the display area 410 from electrostatic discharge are formed surrounding the display area 410. The short circuit adjacent to the edge of the display area 410 is named the inner short-ring 406, the short circuit adjacent to the edge of the LCD panel 400 is named the outer short-ring 408, and the short circuit located between the inner short-ring 406 and the outer short-ring 408 is named the inner short-ring 407. Wherein the outer short-ring 408 electrically connects to the data lines 402 and the scan lines 404, the inner short-rings 406 and 407 do not electrically connect to the display area 410 directly.

In addition, a plurality of guards 409 is installed between the inner short-ring 406 and the outer short-ring 408 used for protecting the LCD panel 400 from the EMI generated by these short-rings. For example, each guard 409 consists of two TFT devices that electrically connect the outer short-ring 408 and the display area 410 respectively used for protecting the signals transferring within the data lines 402 and the scan lines 404 of the LCD panel 400 from the EMI generated by these short-rings.

The inner short-ring 406 and 407 that are not connected with each other electrically connect to the outer short-ring 408 respectively.

Therefore, the inner short-rings 406 and 407 and the outer short-ring 408 form a short-circuited additional route for dispersing static electricity. Static electricity accumulated in the display area 400 can be dispersed on the outer short-ring 408 and the inner short-rings 406 and 407.

When the main frame of the LCD panel is obtained, the outer short-ring 408 and guards 409 are then removed by an edge grinding process conducted thereon to disconnect the remained inner short-rings 406 and 407 from the display area 410.

Then the remaining inner short-rings 406 and 407 can serve as repairing lines used to repair the defects occurring on the display area 410 by a laser process.

In the present embodiment, the outer short-ring 408 consists of multiple layers of metal. For example, the outer short-ring 408 consists of a gate metal layer, a source/drain metal layer and a pixel electrode metal layer, wherein the three layers are not coplanar and connect to each other via contacts formed through thereof. The inner short-ring 406 is formed of the source/drain metal layer, and the inner short-ring 407 is formed of the pixel electrode metal layer.

Accordingly, the feature of the present second preferred embodiment is to add additional short-rings for enhancing the effectiveness of static electricity dispersion and for reducing the impact of electrostatic discharge more effectively.

Furthermore the redundant short-rings can be removed by an edge grinding process after the mainframe of the LCD panel is obtained, and the remaining short-rings serve as repairing lines for a laser repairing functionality.

Therefore, the LCD panel of the present provides both functions of developed electrostatic discharge protection and laser repairing without occupying any additional space thereof.

According to the embodiments aforementioned, an LCD panel with high reliability is provided, wherein electrostatic discharge protection circuits are integrated into repairing lines without occupying any additional space thereof to enhance the effectiveness of static electricity dispersion and reduce the impact of electrostatic discharge more effectively. The use of the present invention can increase the yield and reliability of the LCD panel without changing any layout thereof.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An LCD panel with electrostatic discharge protection, comprising:
   a display area; and
   an inner short-ring circuit, adjacent to and surrounding the edge of the display area, disconnected from elements of the display area except for electrical connections made during a repair process, wherein the process of forming the LCD panel includes forming an outer short-ring circuit, adjacent to the edge of the LCD panel and surrounding the inner short-ring circuit, electrically connecting the inner short-ring circuit and the elements in the display area, whereby the static electricity accumulated in the display area is dispersed on the inner short-ring circuit and the outer short-ring circuit during manufacturing.

2. The LCD panel with electrostatic discharge protection in accordance with claim 1, wherein the display area is a pixel array in which the pixels are driven by a plurality of thin film transistors (TFT).

3. The LCD panel with electrostatic discharge protection in accordance with claim 1, wherein the inner short-ring circuit is intersected with scan lines and data lines routed in the display area, wherein the inner short-ring circuit, the scan lines and the data lines are not coplanar with each other, and each of the same is apart from one another.

4. The LCD panel with electrostatic discharge protection in accordance with claim 1, wherein the inner short-ring circuit is a ring-shaped short circuit consisting of at least one metal conductive layer.

5. The LCD panel with electrostatic discharge protection in accordance with claim 1, wherein the outer short-ring circuit is electrically connected to the display area via the data lines and the scan lines during manufacturing.

6. The LCD panel with electrostatic discharge protection in accordance with claim 1, wherein the outer short-ring circuit is a ring-shaped short circuit consisting of one or a plurality of metal conductive layers during manufacturing.

7. The LCD panel with electrostatic discharge protection in accordance with claim 6, wherein there are a plurality of metal conductive layers and each of the metal conductive layers connects with each other via contacts.

8. The LCD panel with electrostatic discharge protection in accordance with claim 1, wherein the repair process is a laser repair process.

9. The LCD panel with electrostatic discharge protection in accordance with claim 1, wherein the process of forming the LCD panel further includes forming a plurality of guards used to protect the signals transferring within the routing of the LCD panel from EMI during manufacturing.

10. The LCD panel with electrostatic discharge protection in accordance with claim 9, wherein each of the guards is settled on a connecting route that electrically connects the outer short-ring circuit and the elements in the display area during manufacturing.

11. The LCD panel with electrostatic discharge protection in accordance with claim 10, wherein the connecting route is the data lines or the scan lines.

12. The LCD panel with electrostatic discharge protection in accordance with claim 9, wherein each of the guards comprises a plurality of TFTs during manufacturing.

13. A LCD panel with electrostatic discharge protection, comprising:

a display area; and an inner short-ring circuit, adjacent to and surrounding the edge of the display area, disconnected from elements of the display area except for electrical connections made during a repair process and intersected with scan lines and data lines routing in the display area, wherein the inner short-ring circuit, the scan lines and the data lines are not coplanar with each other, and are apart from one another, wherein the process of forming the LCD panel further includes forming an outer short-ring circuit, adjacent to the edge of the LCD panel, surrounding the inner short-ring circuit, and electrically connecting the inner short-ring circuit and elements in the display area; and forming a plurality of guards settled on a connecting route and electrically connecting the outer short-ring circuit and the inner short-ring circuit, used to protect the signals transferring within the routing of the LCD panel from EMI during manufacturing, whereby the static electricity accumulated in the display area is dispersed on the inner short-ring circuit and the outer short-ring circuit during manufacturing.

14. The LCD panel with the electrostatic discharge protection in accordance with claim 13, wherein the inner short-ring circuit is a ring-shaped short circuit of at least one metal conductive layer.

15. The LCD panel with the electrostatic discharge protection in accordance with claim 13, wherein the outer short-ring circuit is electrically connected to the data lines and the scan lines during manufacturing.

16. The LCD panel with the electrostatic discharge protection in accordance with claim 13, wherein the outer short-ring circuit is a ring-shaped short circuit consisting of one or a plurality of metal conductive layers during manufacturing.

17. The LCD panel with the electrostatic discharge protection in accordance with claim 16, wherein there are a plurality of metal conductive layers and each of the metal conductive layers connects with each other via contacts.

18. The LCD panel with the electrostatic discharge protection in accordance with claim 13, wherein each of the guards comprises a plurality of TFTs during manufacturing.

\* \* \* \* \*